(12) United States Patent
Day

(10) Patent No.: US 7,185,052 B2
(45) Date of Patent: Feb. 27, 2007

(54) META CONTENT DELIVERY NETWORK SYSTEM

(75) Inventor: Richard David Day, Mountain View, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 943 days.

(21) Appl. No.: 10/276,088

(22) PCT Filed: May 16, 2001

(86) PCT No.: PCT/US01/15859

§ 371 (c)(1),
(2), (4) Date: Nov. 15, 2002

(87) PCT Pub. No.: WO01/89172

PCT Pub. Date: Nov. 22, 2001

(65) Prior Publication Data

US 2003/0229682 A1    Dec. 11, 2003

(51) Int. Cl.
*G06F 15/16* (2006.01)
*H04L 12/14* (2006.01)
*H04L 12/56* (2006.01)
*H04L 29/06* (2006.01)

(52) U.S. Cl. .................. 709/203; 709/245; 709/229
(58) Field of Classification Search ............. 709/203, 709/229, 245, 223
See application file for complete search history.

(56) References Cited

U.S. PATENT DOCUMENTS 6,888,836 B1 * 5/2005 Cherkasova ............. 370/400

| 2002/0078233 | A1 * | 6/2002 | Biliris et al. ............ 709/238 |
| 2004/0172465 | A1 * | 9/2004 | Shuster et al. .......... 709/223 |
| 2005/0010653 | A1 * | 1/2005 | McCanne ................ 709/219 |
| 2005/0022203 | A1 * | 1/2005 | Zisapel et al. .......... 718/105 |

FOREIGN PATENT DOCUMENTS

| EP | 889 418 | 1/1999 |
| EP | 959 601 | 11/1999 |
| EP | 817 444 | 12/2000 |
| WO | WO 98/50863 | 11/1998 |
| WO | WO 00/04458 | 1/2000 |

OTHER PUBLICATIONS

Cardellini, V., M. Colajanni, and P. Yu; Dynamic Load Balancing on Web-Server Systems; 1999.
Pugh, Angela; Blowing Away Web Delays, Jun. 1999.

* cited by examiner

*Primary Examiner*—Larry D. Donaghue
(74) *Attorney, Agent, or Firm*—Kirk D. Wong; Hickman Palermo Truong & Becker LLP

(57) ABSTRACT

A meta content delivery network system provides a Meta CDN DNS (MCD) server that performs scheduling for multiple content delivery networks (CDN) and is authoritative for all domains given to the CI)Ns. The MCD contains information about CDNs which participate in each CDN domain names. Each CDN provides to the Meta CDN a domain name that will refer to their CDN's portion of the entire Meta CDN for that Meta CDN customer. The MCD receives domain name query requests from local DNSs and selects the proper CDN address based on a predefined capacity reservation of CDNs and statically mapped preferences for certain clients and directs the local DNS requests to the proper CDN address.

40 Claims, 6 Drawing Sheets

META CONTENT DELIVERY NETWORK SYSTEM

BACKGROUND OF THE INVENTION

1. Technical Field

The invention relates to network traffic management in a computer environment. More particularly, the invention relates to traffic scheduling between multiple independent content delivery networks in a computer environment.

2. Description of the Prior Art

A Content Delivery Network (CDN) is collection of caching, streaming, storage, and other servers distributed throughout the Internet in order to deliver content closer to the end user, avoiding the "middle mile" problem.

CDN's provide two main benefits to their users (in this case the user is the customer or content owner, not the end user). The first is reduction of traffic at the origin site. Every request that arrives at the CDN is a request not arriving at the origin site. This means that the origin site will have less work to do as it utilizes the CDN more and more. In addition, the type of work that is being removed is often very different than what will continue to be directed at the origin site. As an example, all of the requests for images which result in many connections to a server are removed from the origin while connections that need access to the database remain. This allows the origin site to be tuned for the database type requests that it will be receiving. A CDN of at least one POP will provided this benefit to a customer.

The second benefit is increased performance for the delivery of the content by reducing the network delay between the browser and the content. This is done by placing servers in locations near the end users and using a system to direct end users to the "best" server. Each customer will have a different group of end users. Some will need full global coverage while other may only need certain parts of the world.

A network provider building their own CDN has a very cost effective solution for solving the first problem of reducing origin site load. Owning their own network, they often see their internal costs for using it as very low, and as a result can price a CDN solution very low. The ability of a given network provider to solve the second issue with only their own connectivity, will not work for all customers.

Today there are two types of CDNs generally available: facilities-based CDNs (also referred to as an on-net CDN) and multi-network CDNs. A facilities-based CDN has deployment limited to a single service provider's network and points of presence (POPs). A multi-network, CDN has servers distributed on many different service provider networks and POPs.

In general, multi-network CDNs provide higher performance, availability, redundancy, and scalability than facilities-based CDNs, due to the fact that no one service provider network controls all the content providers (servers) and/or the eyeballs (clients). Also, not many service providers have sufficient coverage and POPs to distribute and deliver content. Thus, a multi-network CDN will outperform a facilities-based CDN in all cases.

However, some service providers still want to create a facilities-based CDN in order to maintain traffic on their own network as well as to participate in this new and growing market. There is a need to provide the facilities-based CDN providers the advantages of multi-network CDNs.

It would be advantageous to provide a meta content delivery network system that provides load balancing and traffic scheduling across independent CDNs in a computer network. It would further be advantageous to provide a meta content delivery network system that allows CDN providers to designate the availability of their networks.

SUMMARY OF THE INVENTION

The invention provides a meta content delivery network system. The system provides load balancing and traffic scheduling across multiple content delivery networks (CDN) in a computer network. In addition, the invention allows CDN providers to designate the availability of their networks and to assign clients to specific CDNs.

A preferred embodiment of the invention provides a Meta CDN scheduling layer above multiple content delivery networks (CDN). This combined Meta CDN provides customers with the combined scale and reach of all the underlying CDNs.

Meta CDN scheduling is performed by a Meta CDN DNS (MCD) server. The MCD server is authoritative for all domains given to customers of the Meta CDN service. The MCD contains information about which CDNs participate in which CDN domain names. Each CDN provides to the Meta CDN a domain name that will refer to their CDN's portion of the entire Meta CDN for that Meta CDN customer.

The MCD receives domain name query requests from local DNSs. It selects the proper CDN address based on a predefined capacity reservation of CDNs and statically mapped preferences for certain clients and directs the local DNS requests to the proper CDN address.

The local DNS finds which DNS server is authoritative for the CDN address and sends a request to that authoritative DNS server. The authoritative DNS server performs load balancing for the servers within its CDN and returns an A record to the local DNS which forwards the A record to the requesting client. The requesting client uses the A record to make a request to a server within the proper CDN.

The MCD defines weights for each CDN which are used to control a weighted scheduling algorithm for the CDNs. The weights are dynamically adjusted to change CDN priorities.

Alternatively, the MCD allocates Name Server (NS) records dynamically to the local DNS. Each CDN keeps the MCD updated with all of the scheduling devices that each CDN uses.

Other aspects and advantages of the invention will become apparent from the following detailed description in combination with the accompanying drawings, illustrating, by way of example, the principles of the invention.

DETAILED DESCRIPTION OF THE INVENTION

The invention is embodied in a meta content delivery network system in a computer environment. A system according to the invention provides load balancing and traffic scheduling across multiple content delivery networks (CDN) in a computer network. In addition, the invention allows CDN providers to designate the availability of their networks and to assign clients to specific CDNs.

The invention provides a Meta Content Delivery Network (CDN) DNS server that enables multiple independent CDN providers to maximize the bandwidth of their network as well as their revenue.

CDNs are a collection of servers deployed at different points on the Internet. A scheduling layer is provided above them that determines which server a given client should use. This scheduling is based on the load/availability of each server and their relative proximity, or latency, to the clients (users). By directing clients to the least loaded and lowest latency server, download time is greatly reduced as well as the load on the origin servers.

There are two main architectures in use by CDNs: on-net and overlay. Both methods have the CDN as authoritative for the domain name to be accelerated through DNS. Varying degrees of importance are placed on the role DNS takes in making the actual server selection.

On-Net Architecture

Figure 1:
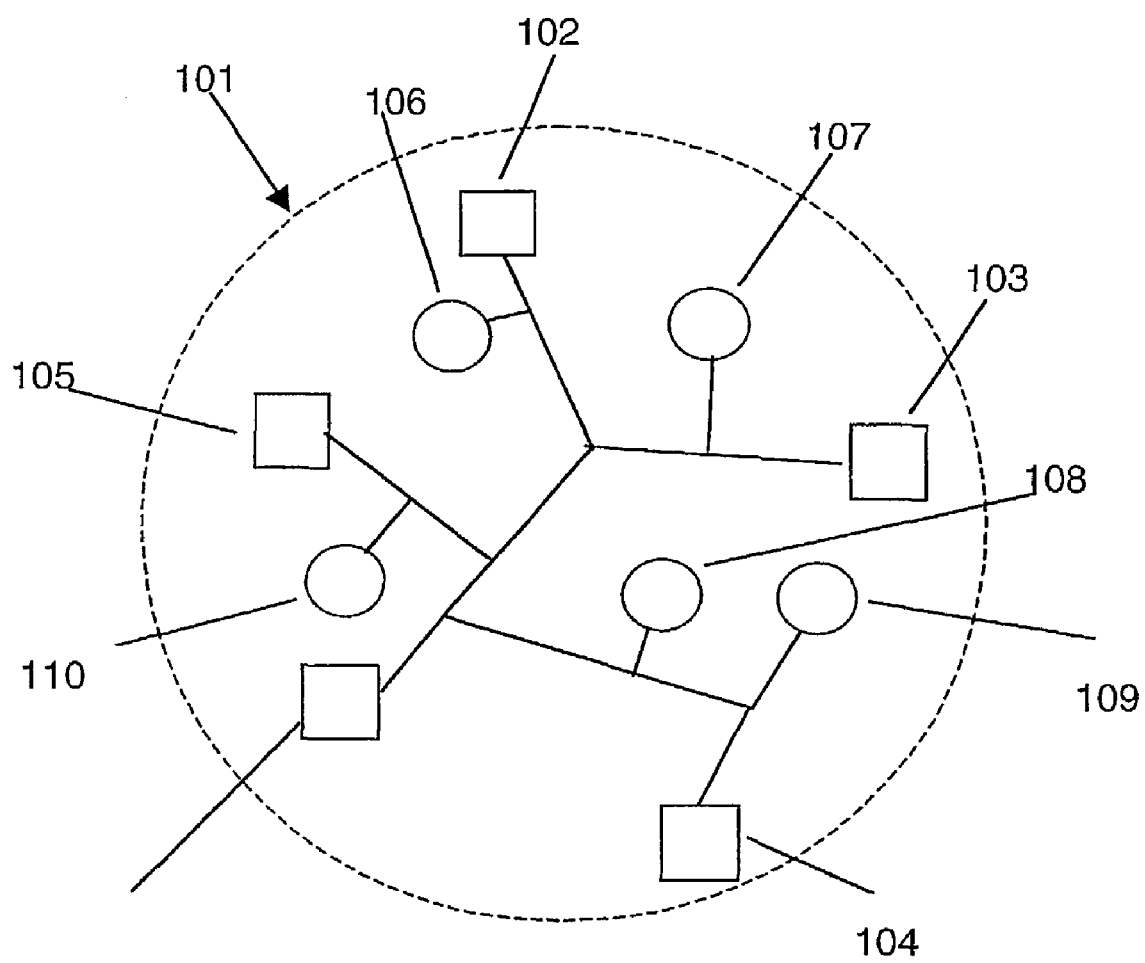
FIG. 1 is a block schematic diagram of an on-net architecture according to the invention.

Referring to FIG. 1, an on-net deployment is a collection of servers 102, 103, 104, 105 arranged around the edge of a single network 101. This allows content to be served from the "on network" side of peering points, reducing the traffic across the backbone of the on network. In addition, it places servers 102, 103, 104, 105 close to clients 106, 107, 108, 109, 110 who are on network.

Since the servers exist on a single network, routing techniques can be used to direct clients to the server with the least latency to a given client. This can be achieved by broadcasting routes for the IPs of the servers out all interfaces that connect this network to other networks. This causes off net client requests to find the closest entry point to the on network where they immediately find a server with that IP. Because the CDN owns the network, it is able to deploy servers in locations such as peering points to make the service compelling. Network traffic still needs to cross the peering point for clients that originate from off net.

Overlay Architecture

Figure 2:
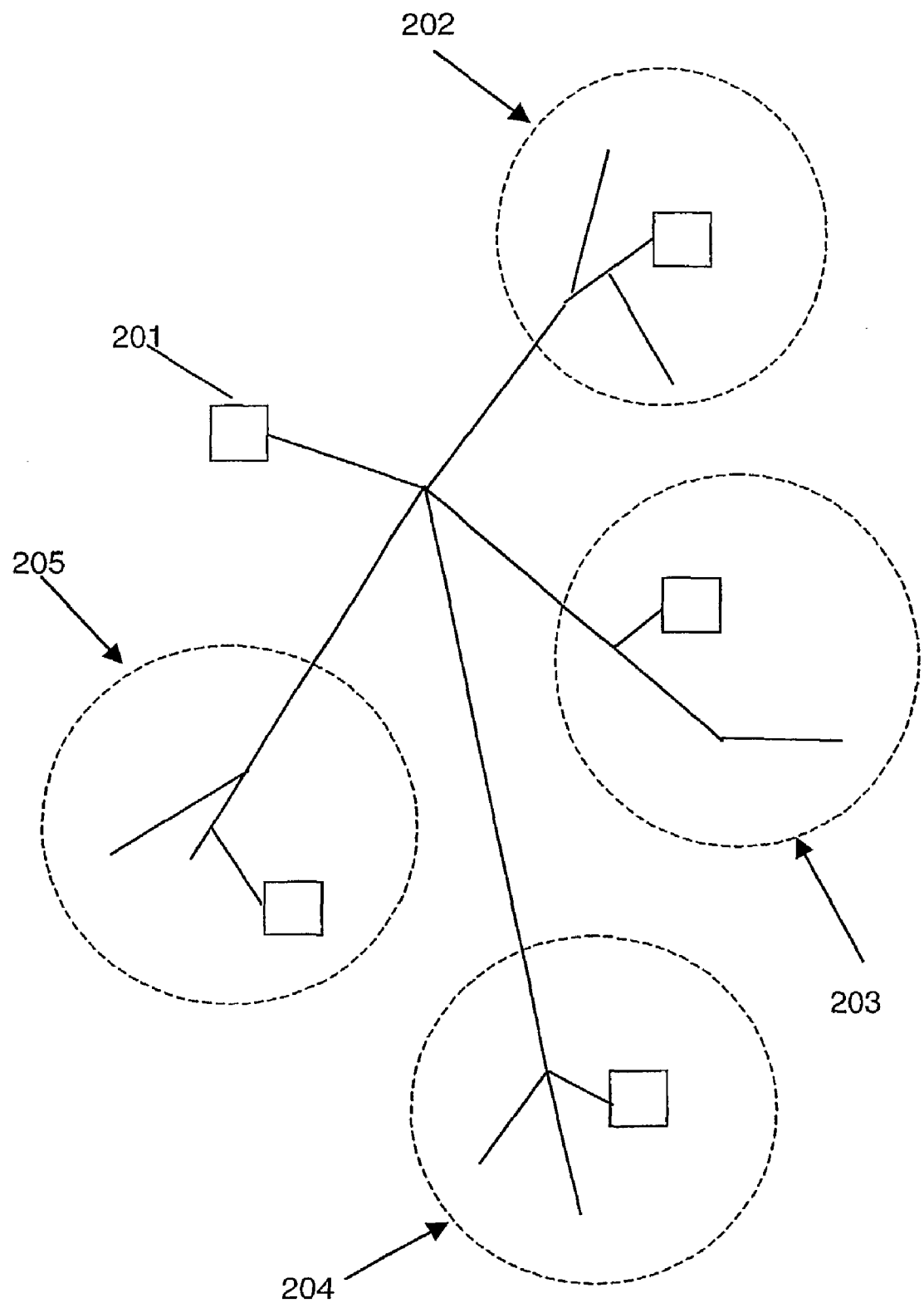
FIG. 2 is a block schematic diagram of an overlay architecture according to the invention.

With respect to FIG. 2, overlay networks deploy their servers across multiple networks 202, 203, 204, 205. Because these deployments span networks 202, 203, 204, 205, scheduling using routing tricks is difficult or impossible. Instead, overlay architectures are usually designed around a smart DNS server 201 that makes the determination of where to send users at DNS resolution time.

The smart DNS server 201 uses the source IP address of the client making the request to determine latency from the client to servers in the network. The Smart DNS server 201 also uses server load and availability information to direct the client to the best possible server.

Domain Names

In both architectures, to have content served from a CDN, the content must be under a domain that the CDN is authoritative for. This is done by the content owner delegating a domain name to the CDN or by the CDN creating a name in their domain for the customer to use. The latter tends to work better as it avoids any possible misconfiguration of the DNS on the part of the content owner.

The CDN has to understand what type of content the customer needs to support and may have content types mapped into domain names. In other words, when the customer wants to use the CDN for SSL content, they may use the hostname ssl-customer.cdn.com. For HTTP content, they may use the hostname http-customer.cdn.com. This allows the CDN to have specialized servers for different types of content.

Protocol Support

Communication on the Internet takes multiple forms, HTTP, SSL, FTP, streaming media, etc. CDNs, since they are not the creators of the content, cache content on behalf of the creator. Not all CDNs support all content types, or if they do, they may go about supporting a protocol using different solutions.

How Content Gets In

There are typically two methods for getting content into a CDN; proxying and publishing. The different methods are chosen for different reasons based on the way the content will be used.

Content Proxying

Figure 3:
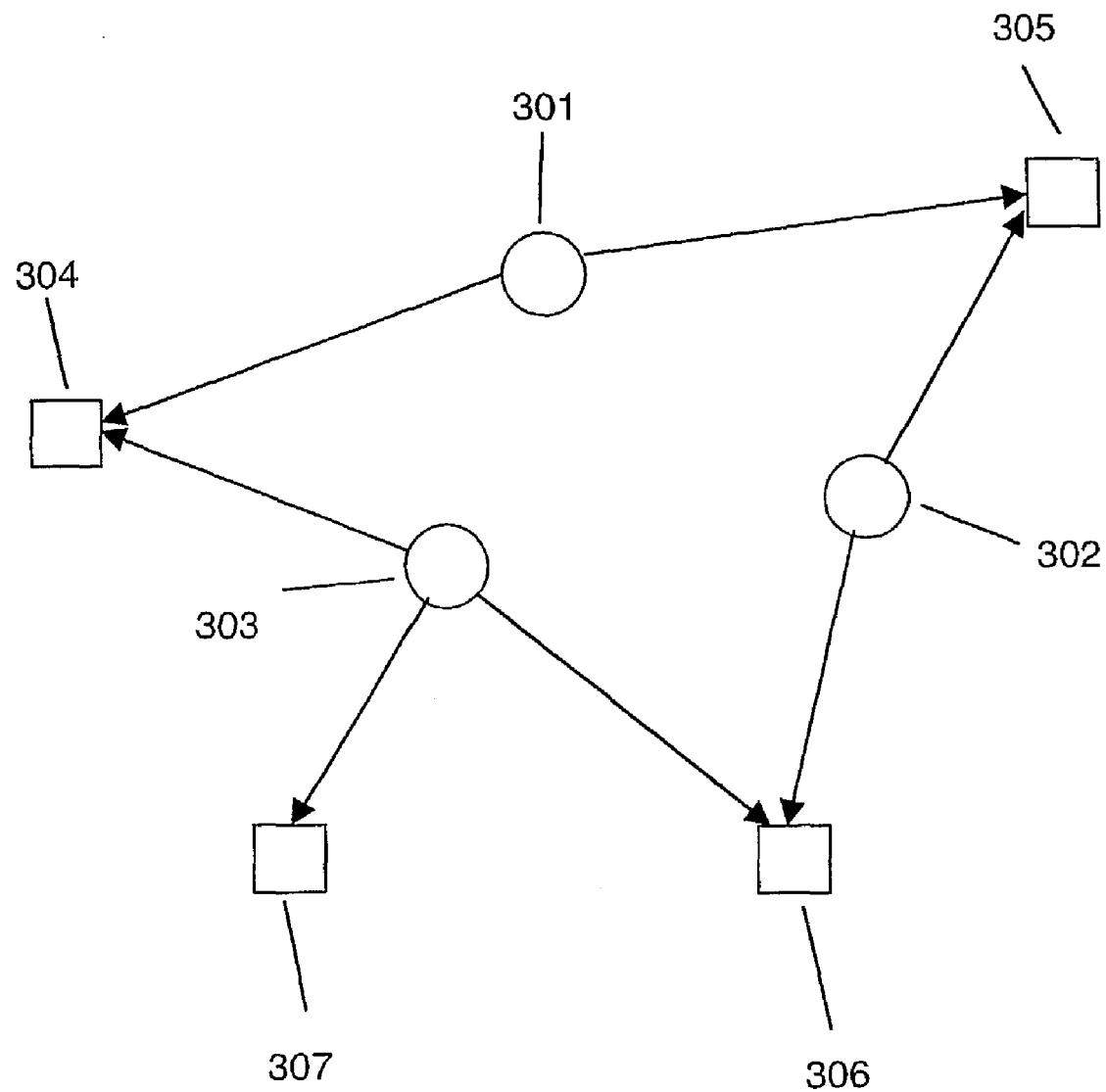
FIG. 3 is a block schematic diagram of a content proxying example according to the invention.

Rferring to FIG. 3, using content proxying, origin servers 301, 302, 303, keep master copies of content and CDN servers 303, 304, 305, 306 cache content. Requests sent to CDN servers include enough information to allow them to fetch the content from the origin servers if the content is not already cached.

The mapping of requested content to origin content is accomplished using multiple methods and is protocol dependent. HTTP and SSL protocol requests normally use one of two methods: embedded URL information and Host directive mapping. As a real example of each, consider a single piece of content we wish to have served from a CDN:
http://www.customer.com/path/to/object.gif If the content is going to be mapped to the origin site by the host directive the CDN URL would look like this:
http://customer.cdn.com/path/to/object.gif CDN servers would notice the HTTP host header customer.cdn.com and would have a table that maps it to www.customer.com.

Host based directive approaches have a few draw backs. First, a different CDN domain name needs to be given for each customer origin site. Second, all webcaches have to be updated with information in some way to add a new customer to the system. Finally, clients that do not send the host directive in their request will not be able to be supported with this solution.

If the content is going to be mapped to the origin site using embedded URL information, the CDN URL could look like this:
http://customer.cdn.com/www.customer.com/path/to/object-.gif In this solution, the CDN server can find the name of the origin site in the request (in this case in-between the first two slashes). This approach reduces the complexity of having to ensure that the CDN servers have access in some way to the host directive mapping and solves the problem of supporting clients that do not send a host directive in their requests. This approach requires changing the URLs that refer to the content to a URL formatted as above.

Content Publishing

Using content publishing, CDN servers are thought of like origin sites. An external mechanism is used to ensure the CDN servers are in sync with the origin site. This could be thought of as a mirroring solution. It tends to work well for large file size content or protocols that do not lend themselves well to proxying.

Meta Content Delivery Network

Figure 4:
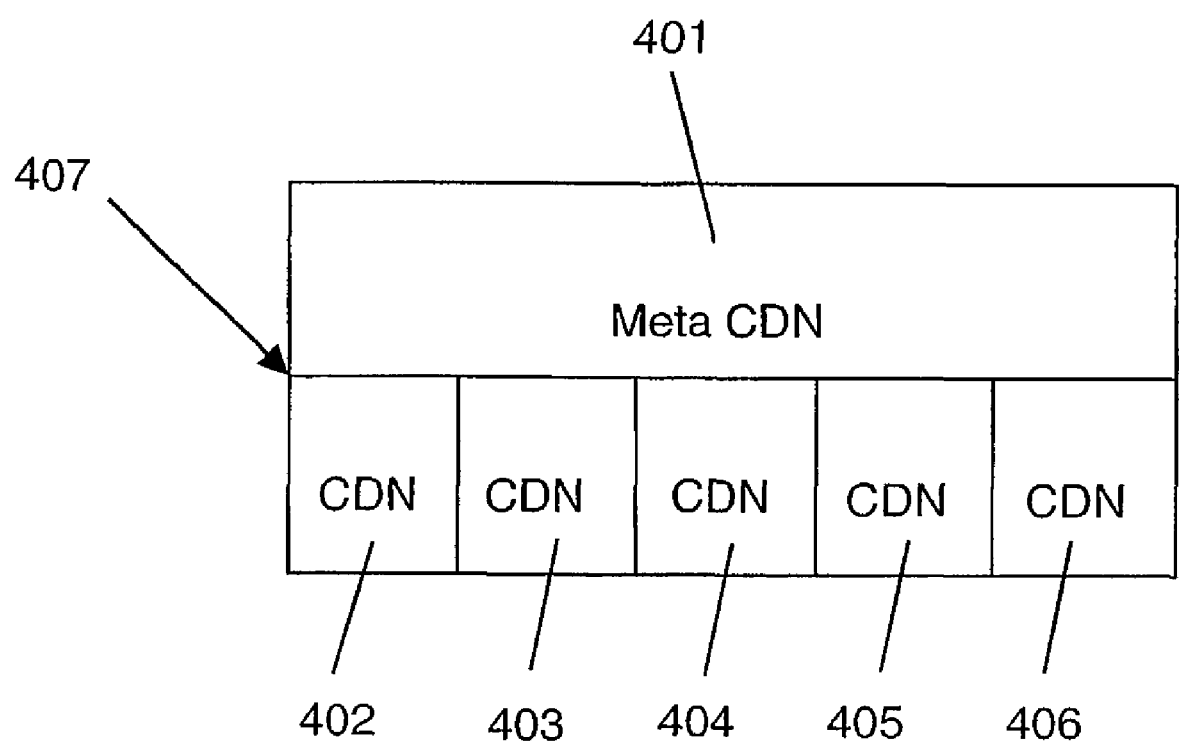
FIG. 4 is a block schematic diagram of a Meta CDN scheduling layer above multiple CDNs according to the invention.

With respect to FIG. 4, the Meta CDN 401 provides a scheduling layer above multiple content delivery networks 402, 403, 404, 405, 406. This combined Meta CDN 407 provides customers with the combined scale and reach of all the underlying CDNs. The benefits to the customer is greater than that which can be provided by any of the underlying CDNs.

Architecture

Figure 5:
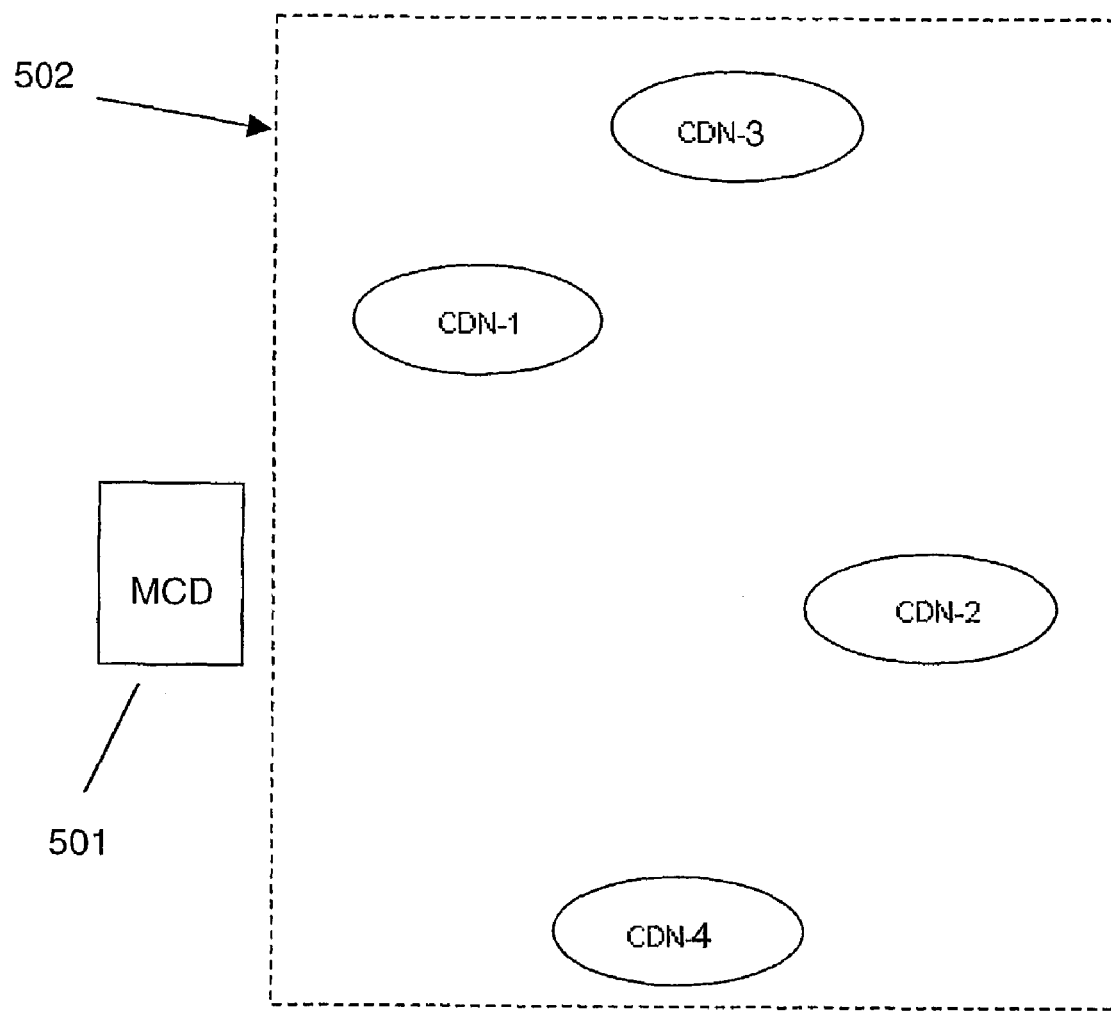
FIG. 5 is a block schematic diagram of an authoritative Meta CDN DNS (MCD) server for a group of CDNs according to the invention.

Referring to FIG. 5, Meta CDN scheduling is performed by a Meta CDN DNS (MCD) server 501. The MCD server 501 is authoritative for all domains given to customers of the Meta CDN service 502.

Scheduling

The MCD is provided with information about which CDNs participate in which CDN domain names. Each CDN provides to the Meta CDN a domain name that will refer to their CDN's portion of the entire Meta CDN for that Meta CDN customer. Table I shows an example of the information used by the MCD to correlate Meta CDN domain names to the proper CDN.

Domain Names

The Domain Name that the customer uses is controlled by the Meta CDN. Issues such as failed page loads can result if sites use any of the underlying CDN domain names to reference CDN content.

Protocol Support

The Meta CDN supports any Protocol of the underlying CDNs. Any of the CDNs that do not support a particular protocol will not be scheduled to for those domain names.

How Content Gets In

Content never enters the Meta CDN but instead enters each of the underlying CDNs directly through the method used for a particular protocol. This is very simple for "pull" based protocols like HTTP and HTTPS, but requires a Meta CDN entry point for "push" content.

Problems Solved

This invention solves many of the problems that are encountered in an independent CDN situation.

The Meta CDN schedules to the CDN's scheduling devices, giving the CDN the final decision of which server within to utilize. By returning a CNAME, it is up to the client to find the device authoritative for the name. The Meta CDN can alternatively give out NS records dynamically, requiring that each CDN keep the Meta CDN in sync with all of the scheduling devices that they use.

The Meta CDN controls how long a user will be handed off to a CDN before the Meta CDN has the chance to change

| Meta Domain | CDN-1 Domain | CDN-2 Domain | CDN-3 Domain |
| --- | --- | --- | --- |
| Customer1.meta.com | Customer1.cdn-1.com | Customer1.cdn-2.com | Customer1.cdn-3.com |
| Customer2.meta.com | Customer2.cdn-2.com | Not used | Customer2.cdn-3.com |

Figure 6:
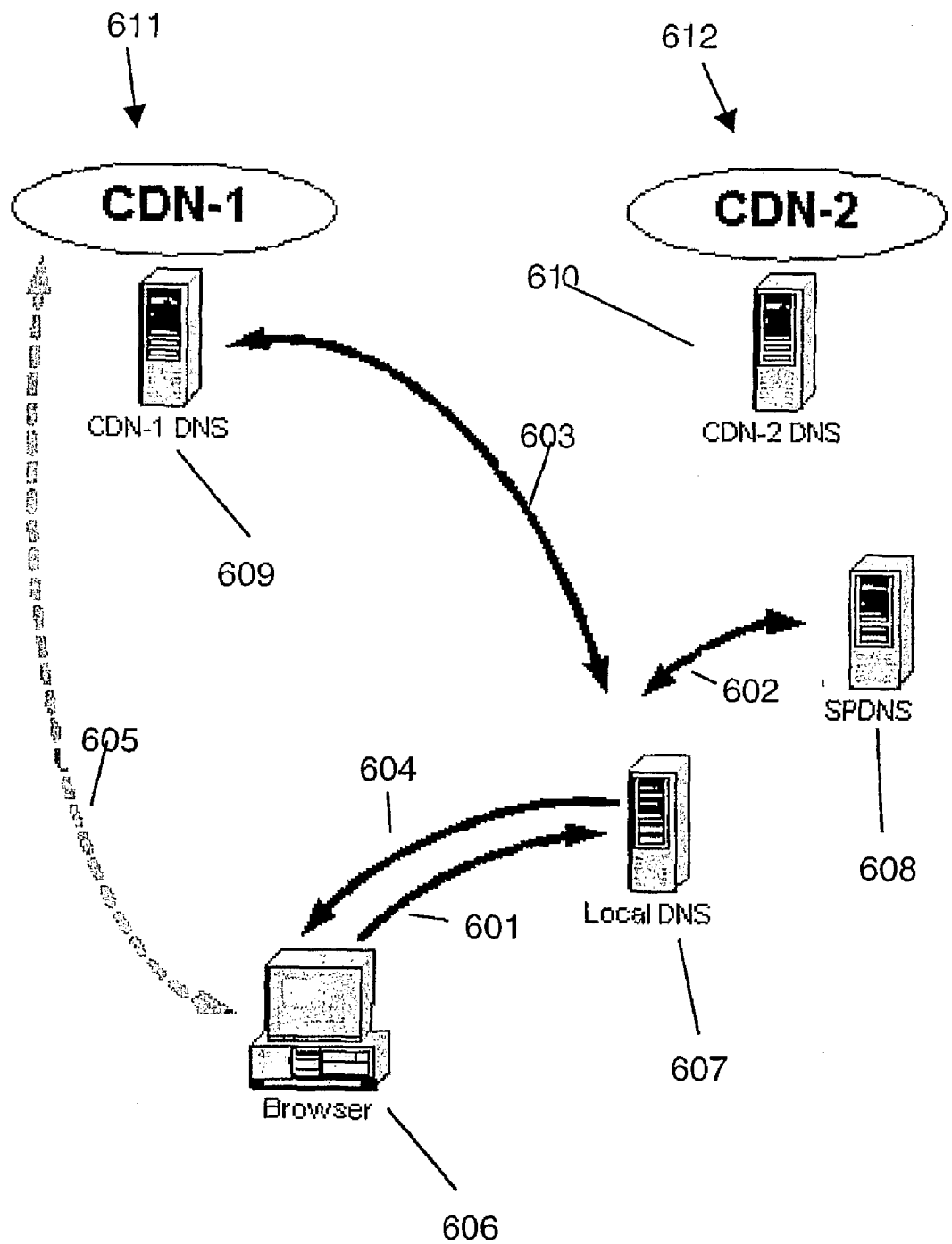
FIG. 6 is a block schematic diagram of an exemplary MCD load balancing and redirection packet flow according to the invention.

With respect to FIG. 6, an example of the MCD operation is shown. Redirection, or load-balancing operates as follows:

1. The browser 606 sends a request 601 to its local DNS 607 for customer1.meta.com
2. The local DNS 607 goes through DNS and finds the Meta DNS server (MCD) 608 to be authoritative for this domain and sends a query 602 to the MCD 608. The MCD 608 looks at the request and returns an answer based on predefined capacity reservation and statically mapped preferences for certain clients 602. An example of this is if one of the CDNs is known to be better suited to server requests from a particular ISP, it will be mapped to do so. The answer comes from the Meta DNS in the form of a CNAME. The Meta DNS controls the TTL on the CNAME and thus controls how long a user is scheduled to a particular CDN. In this example, from Table I, the answer is customer1.cdn-1.com.
3. The local DNS 607 finds who is authoritative for customer1.cdn-1.com and sends a request 603 to the DNS server of CDN-1 609. The DNS for CDN-1 609 performs the load balancing for the servers within CDN-1 and returns an A record 603 to the local DNS 607.
4. The local DNS 607 returns this A record 604 to the client 606.
5. The client 606 makes a request 605 to the server within CDN-1 611.

this decision. The name that the client is looking up is the name Meta CDN name. Any TTLs given out by each CDN on their records will not affect the Meta CDN's ability to redirect users.

On a per customer basis, the Meta CDN decides which CDNs a customer will be able to utilize. The Meta CDN maps Meta Hostnames to any amount of the CDNs. This can be done for different billing issues, as well as for feature support.

The Meta CDN can pre map customers to a specific CDN. The Meta CDN allows static mapping tables to be updated on a client IP basis. This allows the Meta CDN operator to determine which CDN they want the traffic for the source IP sent.

The amount of traffic to be scheduled to each CDN by the Meta CDN can be based on percentages. A simple user interface is available to the operator from the CDNs to indicate their availability to accept more traffic. The Meta CDN provides the ability to defines weight for each CDN. These weights act to control a weighted round robin scheduling algorithm in the Meta CDN. In addition, a simple interface is provided to allow each CDN to indicate to the Meta CDN their availability. Weights are also dynamically allocated to allow for adjustments. The Meta CDN has the ability to reserve capacity of CDNs to ensure traffic flow.

Since the Meta CDN redirects traffic to and from CDNs, it has the ability to get billing information directly from the redirected traffic. This enables the Meta CD N provider to accurately bill for the amount of traffic that is redirected for any customer. Each CDN generates billing information for each Meta CDN customer and provides it to the Meta CDN. The Meta CDN aggregates the billing information for each customer. The Meta CDN provides a simple user interface for the operator to retrieve and report billing information and administrate billing parameters.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. A process for scheduling traffic and load balancing among a plurality of Content Delivery Networks (CDNs), comprising the step of:
   providing a meta CDN Domain Name Server (DNS) server;
   wherein the meta DNS server is authoritative for all domains of said CDNs;
   wherein the meta DNS server provides a scheduling layer above said CDNs;
   wherein the meta DNS server directs local DNS requests to a proper CDN;
   wherein the meta DNS server records domain names that each CDN participates in;
   wherein the meta DNS server receives domain name query requests from local DNSs; and
   wherein the meta DNS server returns a CDN domain address based on a predefined capacity reservation of CDNs and statically mapped preferences for certain clients.

2. The process of claim 1, wherein a client's local DNS finds which DNS server is authoritative for said CDN domain address and sends a request to that authoritative DNS server.

3. The process of claim 2, wherein said authoritative DNS server performs load balancing for servers within its CDN and returns an A record to said local DNS.

4. The process of claim 3, wherein said local DNS sends said A record to a requesting client; and wherein the requesting client uses said A record to make a request to a server within the proper CDN.

5. The process of claim 1, wherein the meta DNS server defines weights for each CDN; and wherein said weights are used to control a weighted scheduling algorithm for said CDNs.

6. The process of claim 5, wherein said weights are dynamically adjusted to change CDN priorities.

7. The process of claim 5, wherein each CDN indicates its availability to accept more traffic to the meta DNS server.

8. The process of claim 1, further comprising the step of:
   aggregating billing information for a meta CDN customer;
   wherein each CDN reports to the meta DNS server, the billing information for the meta CDN customer; and
   wherein said billing information is determined by an amount of traffic redirected to a CDN.

9. The process of claim 8, further comprising the step of:
   providing a user interface for an operator to retrieve and report billing information and administrate billing parameters.

10. A process for scheduling traffic and load balancing among a plurality of Content Delivery Networks (CDNs), comprising the step of:
    providing a meta CDN Domain Name Server (DNS) server;
    wherein the meta DNS server is authoritative for all domains of said CDNs;
    wherein the meta DNS server provides a scheduling layer above said CDNs;
    wherein the meta DNS server directs local DNS requests to a proper CDN; and
    wherein the meta DNS server records domain names that each CDN participates in.

11. The process of claim 10, wherein the meta DNS server receives domain name query requests from local DNSs; and wherein the meta DNS server returns a CDN domain address based on a predefined capacity reservation of CDNs and statically mapped preferences for certain clients.

12. The process of claim 11, wherein a client's local DNS finds which DNS server is authoritative for said CDN domain address and sends a request to that authoritative DNS server.

13. The process of claim 12, wherein said authoritative DNS server performs load balancing for servers within its CDN and returns an A record to said local DNS.

14. The process of claim 13, wherein said local DNS sends said A record to a requesting client; and wherein the requesting client uses said A record to make a request to a server within the proper CDN.

15. The process of claim 10, wherein the meta DNS server allocates Name Server (NS) records dynamically; and wherein each CDN keeps the meta DNS server updated with all scheduling devices that each CDN uses.

16. The process of claim 10, wherein the meta DNS server defines weights for each CDN; and wherein said weights are used to control a weighted scheduling algorithm for said CDNs.

17. The process of claim 16, wherein said weights are dynamically adjusted to change CDN priorities.

18. The process of claim 16, wherein each CDN indicates its availability to accept more traffic to the meta DNS server.

19. The process of claim 10, further comprising the step of:
    aggregating billing information for a meta CDN customer;
    wherein each CDN reports to the meta DNS server, the billing information for the meta CDN customer; and
    wherein said billing information is determined by an amount of traffic redirected to a CDN.

20. The process of claim 19, further comprising the step of:
    providing a user interface for an operator to retrieve and report billing information and administrate billing parameters.

21. An apparatus for scheduling traffic and load balancing among a plurality of Content Delivery Networks (CDNs), comprising:
    a meta CDN Domain Name Server (DNS) server;
    wherein the meta DNS server is authoritative for all domains of said CDNs;
    wherein the meta DNS server provides a scheduling layer above said CDNs;
    wherein the meta DNS server directs local DNS requests to a proper CDN;
    wherein the meta DNS server records domain names that each CDN participates in;
    wherein the meta DNS server receives domain name query requests from local DNSs; and
    wherein the meta DNS server returns a CDN domain address based on a predefined capacity reservation of CDNs and statically mapped preferences for certain clients.

22. The apparatus of claim 21, wherein a client's local DNS finds which DNS server is authoritative for said CDN domain address and sends a request to that authoritative DNS server.

23. The apparatus of claim 22, wherein said authoritative DNS server performs load balancing for servers within its CDN and returns an A record to said local DNS.

24. The apparatus of claim 23, wherein said local DNS sends said A record to a requesting client; and wherein the requesting client uses said A record to make a request to a server within the proper CDN.

25. The apparatus of claim 21, wherein the meta DNS server defines weights for each CDN; and wherein said weights are used to control a weighted scheduling algorithm for said CDNs.

26. The apparatus of claim 25, wherein said weights are dynamically adjusted to change CDN priorities.

27. The apparatus of claim 25, wherein each CDN indicates its availability to accept more traffic to the meta DNS server.

28. The apparatus of claim 21, further comprising:
a module for aggregating billing information for a meta CDN customer;
wherein each CDN reports to the meta DNS server, the billing information for the meta CDN customer; and
wherein said billing information is determined by an amount of traffic redirected to a CDN.

29. The apparatus of claim 28, further comprising:
a user interface for an operator to retrieve and report billing information and administrate billing parameters.

30. An apparatus for scheduling traffic and load balancing among a plurality of Content Delivery Networks (CDNs), comprising:
a meta CDN Domain Name Server (DNS) server;
wherein the meta DNS server is authoritative for all domains of said CDNs;
wherein the meta DNS server provides a scheduling layer above said CDNs;
wherein the meta DNS server directs local DNS requests to a proper CDN; and
wherein the meta DNS server records domain names that each CDN participates in.

31. The apparatus of claim 30, wherein the meta DNS server receives domain name query requests from local DNSs; and wherein the meta DNS server returns a CDN domain address based on a predefined capacity reservation of CDNs and statically mapped preferences for certain clients.

32. The apparatus of claim 31, wherein a client's local DNS finds which DNS server is authoritative for said CDN domain address and sends a request to that authoritative DNS server.

33. The apparatus of claim 32, wherein said authoritative DNS server performs load balancing for servers within its CDN and returns an A record to said local DNS.

34. The apparatus of claim 33, wherein said local DNS sends said A record to a requesting client; and wherein the requesting client uses said A record to make a request to a server within the proper CDN.

35. The apparatus of claim 30, wherein the meta DNS server allocates Name Server (NS) records dynamically; and wherein each CDN keeps the meta DNS server updated with all scheduling devices that each CDN uses.

36. The apparatus of claim 30, wherein the meta DNS server defines weights for each CDN; and wherein said weights are used to control a weighted scheduling algorithm for said CDNs.

37. The apparatus of claim 36, wherein said weights are dynamically adjusted to change CDN priorities.

38. The apparatus of claim 36, wherein each CDN indicates its availability to accept more traffic to the meta DNS server.

39. The apparatus of claim 30, further comprising:
a module for aggregating billing information for a meta CDN customer;
wherein each CDN reports to the meta DNS server, the billing information for the meta CDN customer; and
wherein said billing information is determined by an amount of traffic redirected to a CDN.

40. The apparatus of claim 39, further comprising:
a user interface for an operator to retrieve and report billing information and administrate billing parameters.

* * * * *